July 9, 1946.  C. B. BROWN  2,403,631
METHOD FOR DETERMINING THE PETROLEUM HYDROCARBON
CONTENT OF EARTH SAMPLES
Filed July 5, 1943
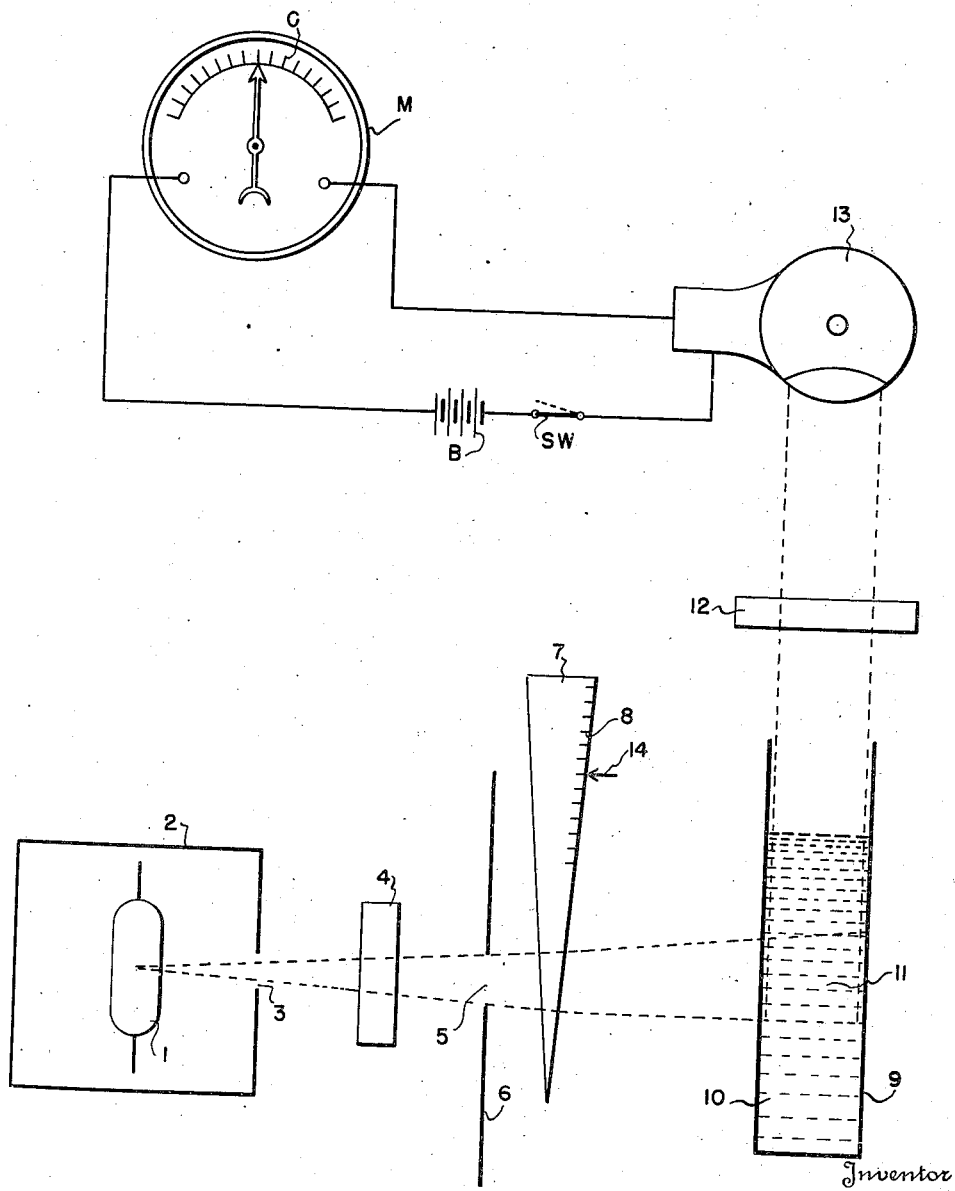
Inventor
Charles B. Brown Patented July 9, 1946

2,403,631

UNITED STATES PATENT OFFICE 2,403,631

METHOD FOR DETERMINING THE PETROLEUM HYDROCARBON CONTENT OF EARTH SAMPLES

Charles B. Brown, McAllen, Tex.

Application July 5, 1943, Serial No. 493,606

3 Claims. (Cl. 250—83.3)

This invention relates to a method for use in locating oil deposits and oil bearing strata encountered in wells being drilled for oil and has more particular reference to an improved method for accurately analyzing earth samples for the petroleum hydrocarbon and pseudo-hydrocarbon content thereof.

In the processes of exploration for petroleum and petroleum bearing strata by analysis of earth samples for their hydrocarbon content heretofore employed, considerable difficulty has arisen in distinguishing between those hydrocarbons associated with petroleum deposits and petroleum bearing strata and those hydrocarbons associated with organic phenomona unrelated to petroleum deposits and petroleum bearing strata. Attempts have been made to use the fluorescent phenomena observed when hydrocarbons and their solutions are subjected to ultraviolet radiation for the purpose of analysis, but this method has not been entirely satisfactory because of the interference of hydrocarbons not associated with petroleum causing false indications. Furthermore, with the method heretofore employed, the intensity of fluorescence has been found to be not directly proportional to the concentration of the various hydrocarbons in solution and for this reason such methods do not afford an accurate measure of the hydrocarbon content of the earth sample.

The improved method in accordance with the present invention eliminates these difficulties by preparing a series of standard empirical charts, separating each of the fluorescent effects of the various hydrocarbons, and accurately measuring the concentration of each hydrocarbon by comparison of the separated fluorescent effect thereof with the empirical charts. The empirical charts may be conveniently prepared by using a series of known hydrocarbons having known concentrations.

My method comprises the following steps: The earth sample to be analyzed is dried to remove excess moisture and ground to approximately 100 mesh fineness using any well known standard laboratory technique. A measured quantity of the sample is placed in a suitable vessel and a predetermined quantity of a hydrocarbon solvent known to be non-fluorescent of itself is added thereto. The mixture thus formed comprising the sample and the solvent is allowed to settle and a convenient measured portion of the solvent is transferred to a vessel composed of a material transparent to ultraviolet radiation. The transparent vessel containing the measured portion of the solvent is subjected to an ultraviolet radiation. The fluorescent light issuing from the portion of the solvent is passed through a spectral filter, separated into its spectral components, the intensity of each of which is determined or measured by any well known photometric technique suitable for the purpose.

The fluorescent light issuing from each hydrocarbon in solution possesses a spectral distribution individual thereto. The type and concentration of each hydrocarbon of the sample is determined by comparing the spectral component intensity thereof with the aforesaid empirical charts until an empirical chart is found which possesses the same degree of fluorescence as the hydrocarbon being measured.

One of the objects of the invention is to provide a new and improved method of separating and accurately measuring the concentrations of the various hydrocarbons and pseudo-hydrocarbons found in earth samples and of distinguishing between those hydrocarbons and pseudo-hydrocarbons associated with petroleum and petroleum bearing strata and those hydrocarbons not associated with petroleum and petroleum bearing strata. Another object is to provide a method of accomplishing the aforesaid object rapidly in contradistinction to the relatively slow laboratory methods now in general use.

Still other objects and advantages will be apparent from the following description taken in connection with the sheet of drawing on which is shown in diagrammatic form the various elements and instrumentalities employed with my invention according to a preferred embodiment thereof.

Referring now to the drawing for a more complete understanding of the invention, ultraviolet rays are radiated from a suitable source 1 arranged within a housing 2 and passing through an opening 3 therein. A filter 4 is arranged within the path of travel of the ultraviolet rays to remove the visible components of the radiation whereby only the invisible radiation component passes through the aperture 5 in the shield 6. The intensity of the ultraviolet radiation is controlled by passing it thru the adjustable ultraviolet absorbing wedge shaped member 7 having a plurality of graduated calibrations 8 thereon. The ultraviolet radiation thus controlled in intensity passed through the vessel 9 composed of a material which is transparent to the ultraviolet radiation. The vessel 9 contains the solvent sample 10 which is caused to fluoresce when subjected to the ultraviolet radiation at 11. The fluorescent illumination from that portion 11 of the sample is passed through a spectral filter 12 and falls on a photocell 13.

The photocell is connected in circuit with a calibrated meter M, battery B and switch Sw. With the switch Sw moved to the closed position the intensity of the fluorescent illumination at 13 is measured by comparing the reading of the meter M with a previously determined calibration C of the meter. The spectral filter 12 is adapted to pass a predetermined band thereto and the fluorescent illumination issuing from the solvent sample is thus separated into its spectral components. A series of these spectral filters such as the filter illustrated are used in succession, a separate measurement of intensity being obtained for each filter so employed, the measurements being performed in consecutive order until the entire spectral band has been measured and an intensity reading obtained for each portion of the band. The standard empirical charts employed with the present invention are prepared by performing this measuring operation with known hydrocarbons of different known concentrations and plotting the results as a family of intensity curves corresponding respectively to different spectral bands.

In analysing an earth sample containing an unknown hydrocarbon in accordance with the method of the present invention, the solution containing the unknown hydrocarbon is placed in the vessel 9 and subjected to a predetermined intensity of ultraviolet radiation by adjusting the ultraviolet ray absorbing wedge member 7 such that a predetermined one of the calibrations 8 is opposite the point of reference 14. The intensity of each of the spectral bands issuing from the sample is measured by comparing the readings of the meter M with respect to the calibration C thereof corresponding respectively to each of the spectral filters employed in succession during the measuring operation. These measured intensities are now compared with the aforesaid empirical charts and the type and hydrocarbon content of the sample determined in accordance with the results of this comparison.

What I claim as new and desire to be secured by Letters Patent of the United States is:

1. The method of exploring for subterranean petroleum deposits which consists in, preparing a solution containing a plurality of dissolved hydrocarbons of a measured quantity of an earth sample, subjecting a measured quantity of said solution to an ultraviolet radiation, passing the fluorescent light emanating from said solution through a plurality of spectral filters in succession, each of said filters corresponding respectively to one of a plurality of different bands of the spectrum, measuring the intensity of fluorescent light in each one of said spectral bands respectively, and in comparing the measured intensity of the fluorescent light in each spectral band with each of a plurality of empirical charts in succession respectively, each of said charts corresponding to hydrocarbons of different known concentrations.

2. The method of exploring for subterranean petroleum deposits which consists in, subjecting a solvent containing the dissolved hydrocarbons and pseudo-hydrocarbons of a measured quantity of an earth sample to an ultraviolet radiation of controlled intensity, passing the fluorescent light emanating from the solvent through a plurality of spectral filters in succession, each of said filters corresponding respectively to a different spectral band, measuring the intensities of ultraviolet radiation required to produce a predetermined intensity of fluorescent light in each spectral band respectively, and in comparing the measured ultraviolet intensities with each of a plurality of empirical charts respectively corresponding to hydrocarbons of different known concentrations.

3. The method of determining the presence of a petroleum bearing strata in a well being drilled for oil which consists in, mixing a measured amount of earth sample from the bore hole with a predetermined quantity of a non-fluorescent solvent, subjecting a predetermined fractional portion of said solvent to an ultraviolet radiation, passing the fluorescent light emanating from the solvent through a plurality of spectral filters in succession, each of said filters corresponding to a different spectral band respectively, measuring the intensity of the fluorescent light in each spectral band, and in comparing each of the measured intensities of the fluorescent light with a plurality of empirical charts respectively corresponding to hydrocarbons of known concentrations.

CHARLES B. BROWN.